United States Patent
Sone et al.

(10) Patent No.: US 9,128,839 B2
(45) Date of Patent: Sep. 8, 2015

(54) NUMERICAL CONTROL SYSTEM HAVING REMOVABLE FILTER CIRCUIT

(71) Applicant: FANUC Corporation, Minamitsuru-gun, Yamanashi (JP)

(72) Inventors: Yuuji Sone, Minamitsuru-gun (JP); Hiroshige Andou, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 168 days.

(21) Appl. No.: 14/031,617

(22) Filed: Sep. 19, 2013

(65) Prior Publication Data

US 2014/0082436 A1    Mar. 20, 2014

(30) Foreign Application Priority Data

Sep. 20, 2012   (JP) ................................. 2012-206721

(51) Int. Cl.
*G06F 11/07* (2006.01)
(52) U.S. Cl.
CPC .................................. *G06F 11/0772* (2013.01)
(58) Field of Classification Search
CPC ............ G06F 11/0772; G06F 11/0781; G06F 11/0784; G06F 17/30536; G06F 17/30578; H04L 41/06; H04L 43/0817; H04L 43/0823; H04L 43/10; H04L 43/0847
See application file for complete search history.

(56) References Cited

U.S. PATENT DOCUMENTS

| | | | |
|---|---|---|---|
| 5,822,615 A * | 10/1998 | Yamashita et al. ............... | 710/10 |
| 6,182,163 B1 * | 1/2001 | Yamashita et al. ............... | 710/12 |
| 7,940,057 B2 * | 5/2011 | Hada et al. ...................... | 324/537 |
| 2008/0052417 A1 * | 2/2008 | Aoyama et al. ................... | 710/1 |

FOREIGN PATENT DOCUMENTS

| | | |
|---|---|---|
| JP | S64-39848 A | 2/1989 |
| JP | H05-22329 A | 1/1993 |
| JP | H07111605 A | 4/1995 |
| JP | H07-115393 A | 5/1995 |
| JP | H09-7699 A | 1/1997 |
| JP | 2003234707 A | 8/2003 |
| JP | 2010-271342 A | 12/2010 |

* cited by examiner

*Primary Examiner* — Nadeem Iqbal
(74) *Attorney, Agent, or Firm* — Drinker Biddle & Reath LLP (57) ABSTRACT

In a numerical control system including a plurality of data communication apparatuses and a numerical controller that transmits and receives data to and from the data communication apparatuses, a filter circuit is removably attached to each of a connection unit of the numerical controller and connection units of the data communication apparatuses. By detecting an error information based on a data transfer error or the sign of the data transfer error, a filter circuit that needs to be replaced is specified. Thus, the noise immunity of only a required portion of the filter circuits is increased, as a result, it is possible to suppress the cost for noise reduction while increasing the noise immunity of the entire system.

9 Claims, 7 Drawing Sheets

PLEASE REPLACE FILTER CIRCUIT
IN LATER STAGE OF FIRST DATA COMMUNICATION APPARATUS
AND FILTER CIRCUIT IN PREVIOUS STAGE OF SECOND DATA
COMMUNICATION APPARATUS

NUMERICAL CONTROL SYSTEM HAVING REMOVABLE FILTER CIRCUIT

RELATED APPLICATION DATA

This application claims priority under 35 U.S.C. §119 and/or §365 to Japanese Application No. 2012-206721 filed Sep. 20, 2012, the entire contents is incorporated herein by reference.

BACKGROUND OF THE PRESENT INVENTION

1. Field of the Present Invention

The present invention relates to a numerical control system including a numerical controller and data communication apparatuses each having a removable filter circuit.

2. Description of the Related Art

In a numerical control system including a numerical controller and data communication apparatuses, increasing the noise immunity so that an appropriate operation is performed without causing a malfunction has been required. As a method to increase the noise immunity, there is a method of using noise suppression parts. However, taking measures against excessive noise, which is infrequently generated, for preventing malfunction leads to using a number of noise suppression parts. As a result, a data communication apparatus and a numerical control system using data communication apparatuses become expensive.

In particular, in the case of a system in which a plurality of data communication apparatuses as slave apparatuses are connected to a master apparatus, such as a numerical controller, in a daisy-chain mode, a number of data communication apparatuses are used in the entire system. Accordingly, if each data communication apparatus becomes expensive, the entire numerical control system becomes expensive.

Incidentally, various points can be considered as noise occurrence points in the numerical control system. In many cases, however, it is known that trouble in data communication between data communication apparatuses due to the influence of noise occurs when noise is superimposed on a communication cable located in a specific section within the electric panel or a power cable to supply electric power to each data communication apparatus. In addition, when noise is superimposed on the communication cable or the power cable, trouble or failure of the transmitted signal may occur. That is, if only the noise immunity at a location where trouble has occurred in data communication due to noise can be increased, it is possible to increase the noise immunity of the entire system. In addition, it is possible to reduce the cost for noise reduction in the entire system.

If a number of noise suppression parts are used, it is possible to increase the noise immunity of the data communication apparatus so that malfunction does not occur even for excessive noise. However, the data communication apparatus and the system using the same become expensive. In particular, in a system in which a plurality of data communication apparatuses are connected to each other, a number of data communication apparatuses are used in the entire system. For this reason, there has been a problem in that the entire numerical control system becomes expensive if each data communication apparatus becomes expensive.

SUMMARY OF THE PRESENT INVENTION

Therefore, it is an object of the present invention to increase the noise immunity of the entire system without using excessive noise suppression parts by enabling a filter circuit of a data communication apparatus, which is used for noise reduction, to be replaced so that only a filter circuit at a location where trouble occurs in data communication due to noise can be replaced.

A numerical control system according to the present invention includes a plurality of data communication apparatuses and a numerical controller that transmits and receives data to and from the data communication apparatuses. Each of the data communication apparatuses includes: a filter circuit removably attached to a connection unit for connection with the numerical controller or another data communication apparatus that is connected before the data communication apparatus, and/or a connection unit for connection with another data communication apparatus that is connected after the data communication apparatus; a data transfer error detection unit that detects a data transfer error or a sign of the data transfer error as error information; and a data transmission unit that transmits the error information detected by the data transfer error detection unit to the numerical controller. On the other hand, the numerical controller includes: a filter circuit removably attached to the connection unit for connection with the data communication apparatus; a data transfer error detection unit that detects a data transfer error or a sign of the data transfer error as error information; an error information storage unit that stores the error information detected by the data transfer error detection unit of the numerical controller and the error information received from the data communication apparatus, in association with the numerical controller or the data communication apparatus in which the error information has occurred; a filter circuit replacement determination unit that specifies a filter circuit, which needs to be replaced, of the filter circuits provided in the numerical controller and the data communication apparatus from the error information stored in the error information storage unit; and an output unit that outputs information prompting replacement of a filter circuit specified on the basis of a determination result of the filter circuit replacement determination unit.

The plurality of data communication apparatuses may be connected in series to each other.

The filter circuit may be configured to include a first filter circuit removably attached to the data communication apparatus or the numerical controller and a second filter circuit fixed to the data communication apparatus or the numerical controller.

Each filter circuit may have a unique ID by which the filter circuit is identifiable, and each of the numerical controller and the data communication apparatuses has an ID storage unit. When electric power is supplied to the numerical control system, the unique ID may be stored in the ID storage unit of the numerical controller or the data communication apparatus in which the filter circuit is provided. When error information is detected in the numerical controller or the data communication apparatus, the error information and the unique ID of the filter circuit, which is stored in the ID storage unit of the numerical controller or the data communication apparatus in which the error information has been detected, are stored in the error information storage unit of the numerical controller.

The numerical controller may further include a connection information storage unit that stores connection information regarding a connection with a data communication apparatus connected to the numerical controller. The filter circuit may have a unique ID by which the filter circuit is identifiable, and the ID of the filter circuit may be stored in the connection information storage unit at the time of initialization processing when electric power is supplied to the numerical control system.

The numerical controller may further include a filter information storage unit that stores noise immunity levels of a plurality of filter circuits. The filter circuit replacement determination unit may specify the noise immunity level of a filter circuit, which is to be replaced, from the error information and the noise immunity levels. When the output unit outputs the information prompting the replacement of the filter circuit, information of a filter circuit having noise immunity specified on the basis of a determination result of the filter circuit replacement determination unit may be output.

According to the present invention, only the noise immunity at a location where a data transfer error has occurred is increased. As a result, compared with a case where a number of noise suppression parts are used in the entire system, it is possible to increase the noise immunity of the system while suppressing the cost of the data communication apparatus and the entire system.

BRIEF DESCRIPTION OF THE DRAWINGS

The above and other objects and features of the present invention will become apparent from the following explanation with reference to the accompanying drawings, in which.

DETAILED DESCRIPTION OF THE PREFERRED EMBODIMENTS

The configuration of a numerical controller included in a numerical control system according to the present invention will be described with reference to FIG. 1.

A numerical controller 2 includes a data transmission and reception circuit 21, an ID storage unit 25, a data transfer error detection unit 26, a filter information storage unit 27, a connection information storage unit 28, an error information storage unit 29, a filter circuit replacement determination unit 31, and an output unit 30.

The data transmission and reception circuit 21 has a data communication control unit 22 connected to an internal bus 24, and a filter circuit 6 can be attached to or detached from the data communication control unit 22. The ID storage unit 25 stores a unique ID of the filter circuit 6 provided in the data transmission and reception circuit 21. The data transfer error detection unit 26 detects a data transfer error or the sign of the data transfer error as the error information. The filter information storage unit 27 stores the noise immunity levels of a plurality of kinds of filter circuits 6. The connection information storage unit 28 stores a connection state of a data communication apparatus 4 connected to the numerical controller 2. The error information storage unit 29 stores the error information that is detected by the data transfer error detection unit 26. The filter circuit replacement determination unit 31 specifies the filter circuit 6 to be replaced on the basis of the error information. The output unit 30 outputs the information prompting the replacement of the filter circuit 6 for which need for replacement is determined.

The configuration of a data communication apparatus included in the numerical control system according to the present invention will be described with reference to FIG. 2.

The data communication apparatus 4 includes a data transmission and reception circuit 41, an ID storage unit 45, and a data transfer error detection unit 46.

The data transmission and reception circuit 41 has a data communication control unit 42 connected to an internal bus 44. In addition, the data transmission and reception circuit 41 includes connection units for making connection with the numerical controller 2 or other data communication apparatuses 4 through a communication cable 7 and a filter circuit 6 that is removably attached to the connection unit. The ID storage unit 45 stores a unique ID of the filter circuit 6 provided in the data transmission and reception circuit 41. The data transfer error detection unit 46 detects a data transfer error or the sign thereof.

Figure 1:
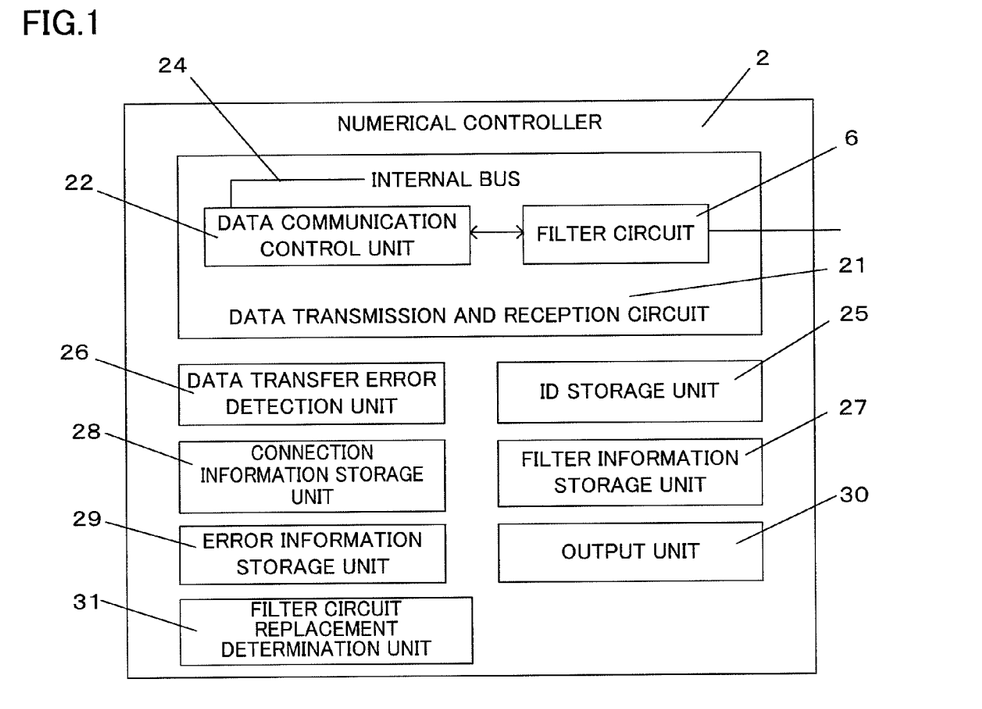
FIG. 1 is a diagram illustrating the configuration of a numerical controller included in a numerical control system according to the present invention.
Figure 2:
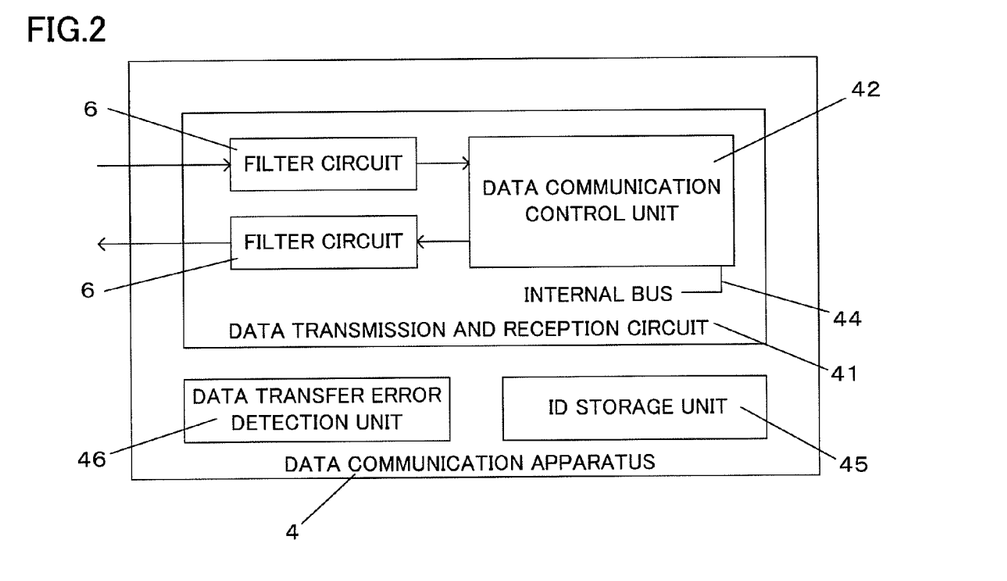
FIG. 2 is a diagram illustrating the configuration of a data communication apparatus included in the numerical control system according to the present invention.
Figure 3:
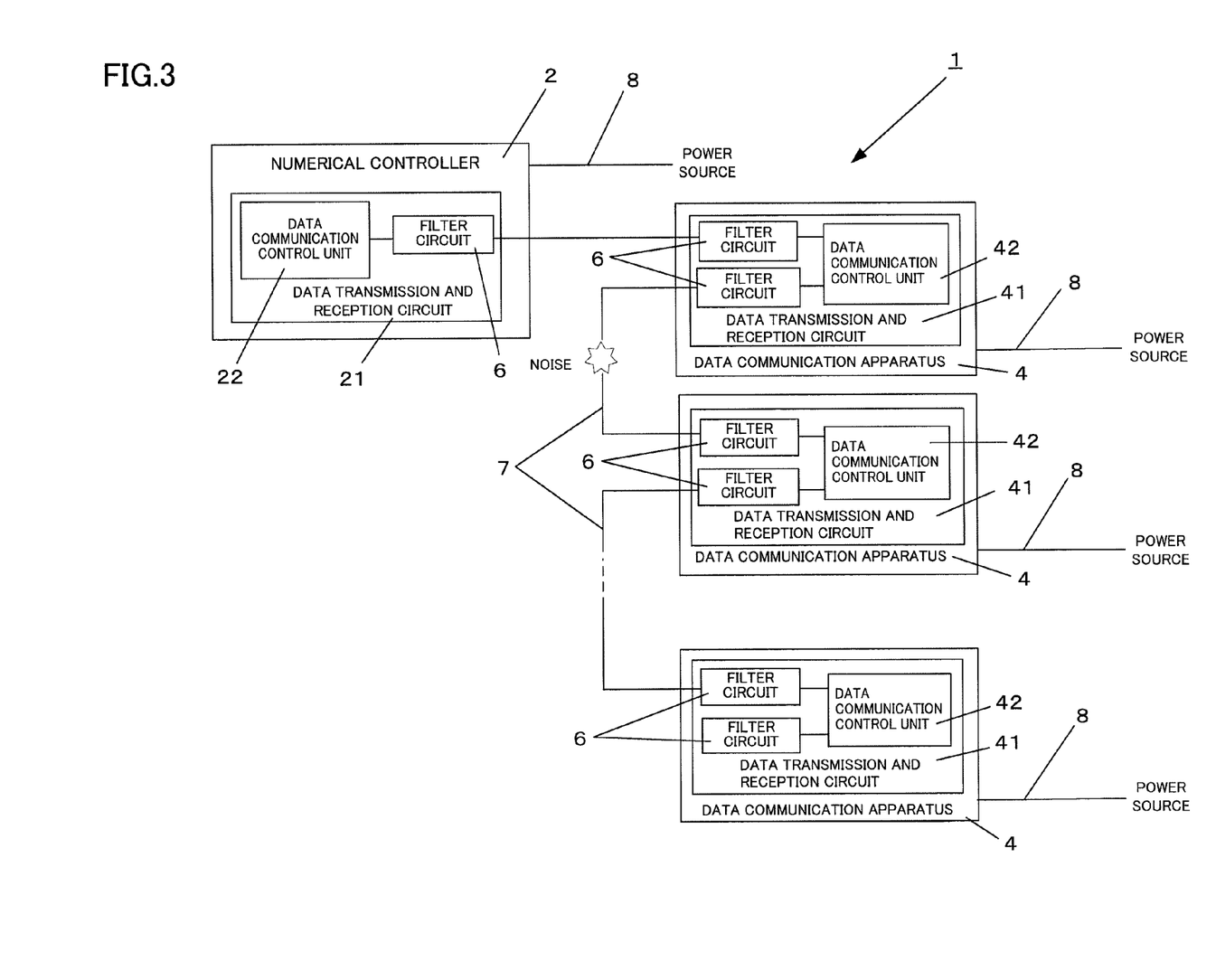
FIG. 3 is a diagram illustrating a case where a data transfer error occurs due to the influence of noise on a communication cable in the numerical control system of the present invention.

A numerical control system 1 illustrated in FIG. 3 is formed using the numerical controller 2 illustrated in FIG. 1 and the data communication apparatus 4 illustrated in FIG. 2. In addition, in FIG. 3, components other than the data transmission and reception circuit 21 in each of the numerical controller 2 and the data communication apparatus 4 are not illustrated.

In the numerical control system 1 illustrated in FIG. 3, a plurality of data communication apparatuses 4 are connected in series with the numerical controller 2 (connected in a so-called daisy-chain mode). Electrical power is supplied from a power source (not illustrated) to the numerical controller 2 and each of the data communication apparatuses 4 through a power cable 8. In addition, the numerical controller 2 and the first data communication apparatus 4 are connected to each other through the communication cable 7, the first data communication apparatus 4 and the second data communication apparatus 4 are connected to each other through the communication cable 7, and the (n−1)-th data communication apparatus 4 and the n-th data communication apparatus 4 are connected to each other through the communication cable 7. The filter circuit 6 is attached to the connection unit of the numerical controller 2, to which the communication cable 7 is connected, and the connection unit of each data communication apparatus 4, to which the communication cable 7 is connected.

FIG. 3 illustrates a case where a data transfer error occurs due to the influence of noise on the communication cable 7 in the numerical control system 1.

In the following explanation, among the plurality of data communication apparatus 4 connected to the numerical controller 2, the data communication apparatus 4 directly connected to the numerical controller 2 is assumed to be the first data communication apparatus 4, the data communication apparatus 4 connected to the first data communication apparatus 4 is assumed to be the second data communication apparatus 4, the data communication apparatus 4 connected to the second data communication apparatus 4 is assumed to be the third data communication apparatus 4, and the fourth, fifth, . . . , data communication apparatuses 4 are assumed according to the order of connection.

In the example illustrated in FIG. 3, a state is shown in which noise is superimposed on the communication cable 7 between the first data communication apparatus 4 and the second data communication apparatus 4. When noise is superimposed on the communication cable 7, the data transfer error detection unit 46 (refer to FIG. 2) in each of the first data communication apparatus 4 and the second data communication apparatus 4, to which the communication cable 7 is connected, detects a data transfer error or the sign thereof.

When the data transfer error or the sign thereof is detected, the data transfer error detection unit 46 outputs the error information and stores the error information in the error information storage unit 29 of the numerical controller 2 through the data transmission and reception circuit 41, in association with the ID of the data communication apparatus 4 in which the data transfer error or the sign thereof has been detected.

Then, the filter circuit replacement determination unit 31 of the numerical controller 2 determines the filter circuit 6 that needs to be replaced, among the filter circuits 6 provided in the numerical controller 2 and the data communication apparatuses 4, based on the error information stored in the error information storage unit 29.

In addition, in the example illustrated in FIG. 3, the filter circuit 6 provided in a connection unit (connection unit in a later stage) for making connection with the second (subsequent) data communication apparatus 4 through the communication cable 7, of two connection units of the first data communication apparatus 4, and the filter circuit 6 provided in a connection unit (connection unit in a previous stage) for making connection with the first (preceding) data communication apparatus 4 through the communication cable 7, of two connection units of the second data communication apparatus 4, are specified as the filter circuit 6 to be replaced. A specific method of detecting a data transfer error or the sign thereof will be described later.

Figure 4:
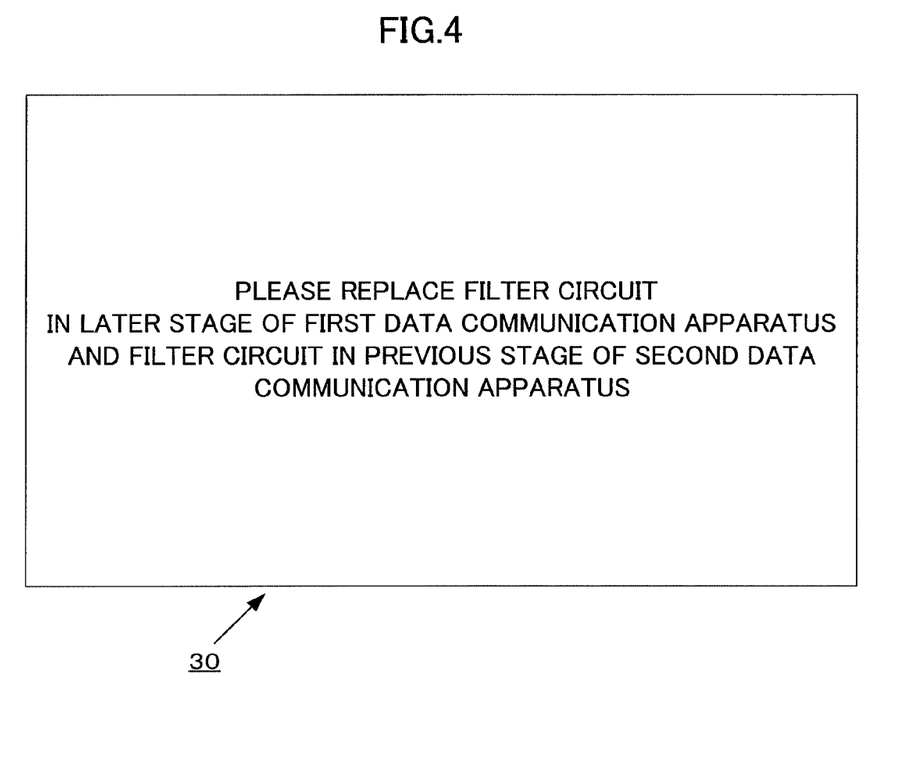
FIG. 4 illustrates an example of a message prompting the replacement of a filter circuit, which is displayed on the basis of the determination result of a filter circuit replacement determination unit, in the numerical control system of the present invention.

In addition, a message prompting the replacement of the filter circuit 6 for which the filter circuit replacement determination unit 31 determined the need for replacement, illustrated in FIG. 4, is displayed on a display that is the output unit 30.

In addition, although the notification of the filter circuit 6 for which the need for replacement was determined is performed by the display of a message using a display in this example, the notification of the filter circuit 6 for which the need for replacement was determined is not limited thereto. For example, the notification may be performed using different kinds of blinking or lighting by providing a plurality of lamps, or the notification may be performed using a sound.

Figure 5:
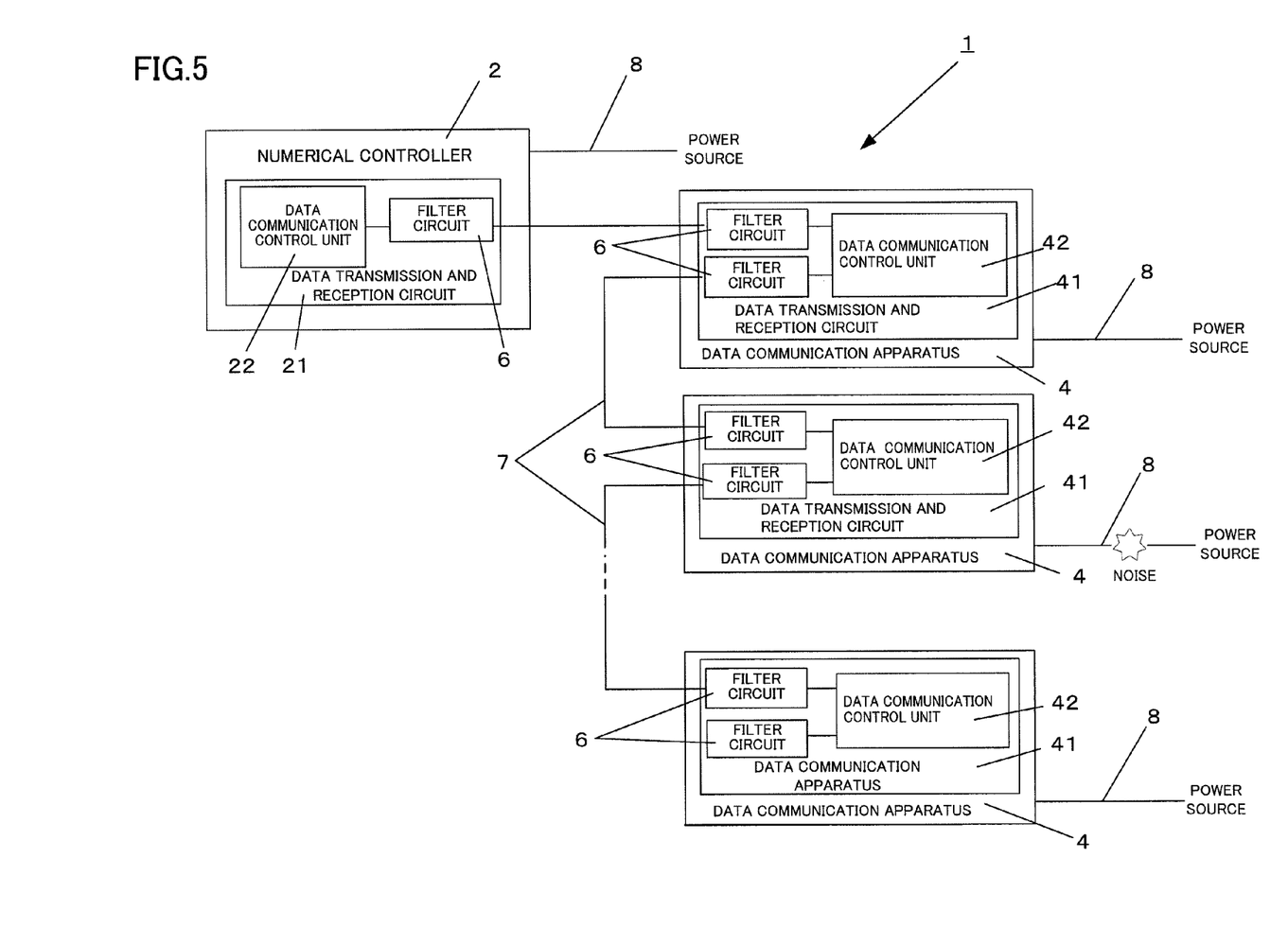
FIG. 5 is a diagram illustrating a case where a data transfer error occurs due to the influence of noise on a power cable in the numerical control system of the present invention.

FIG. 5 is a diagram illustrating a case where a data transfer error occurs due to the influence of noise on the power cable 8 in the numerical control system 1 of the present invention.

In the example illustrated in FIG. 5, noise is superimposed on the power cable 8 of the second data communication apparatus 4. When noise is superimposed on the power cable 8, the data transfer error detection unit 46 in the data communication apparatus 4 to which the power cable 8 is connected detects a data transfer error or the sign thereof. When the data transfer error or the sign thereof is detected, the data transfer error detection unit 46 outputs the error information through the data transmission and reception circuit 41 and stores the error information in the error information storage unit 29 of the numerical controller 2 in association with the ID of the data communication apparatus 4 in which the data transfer error or the sign thereof has been detected.

Then, the filter circuit replacement determination unit 31 of the numerical controller 2 determines the filter circuit 6 that needs to be replaced, among the filter circuits 6 provided in the numerical controller 2 and the data communication apparatuses 4, from the error information stored in the error information storage unit 29. In the example illustrated in FIG. 5, the filter circuits 6 provided in both of two connection units of the second data communication apparatus 4, in other words, the filter circuit 6 provided in a connection unit (connection unit in a previous stage) for making connection with the first (preceding) data communication apparatus 4 through the communication cable 7 and the filter circuit 6 provided in a connection unit (connection unit in a later stage) for making connection with the third (subsequent) data communication apparatus 4 through the communication cable 7, are specified as the filter circuits 6 that need to be replaced.

In addition, in the same manner as in a case where noise is generated in the communication cable 7 as described with reference to FIG. 3, a message prompting the replacement of the filter circuit 6 for which the filter circuit replacement determination unit 31 determined the need for replacement is displayed on a display that is the output unit 30.

In addition, also in this example, the notification of the filter circuit 6 for which the need for replacement was determined may be performed using a lamp or a sound similar to the case where noise is generated in the communication cable 7.

Figure 6:
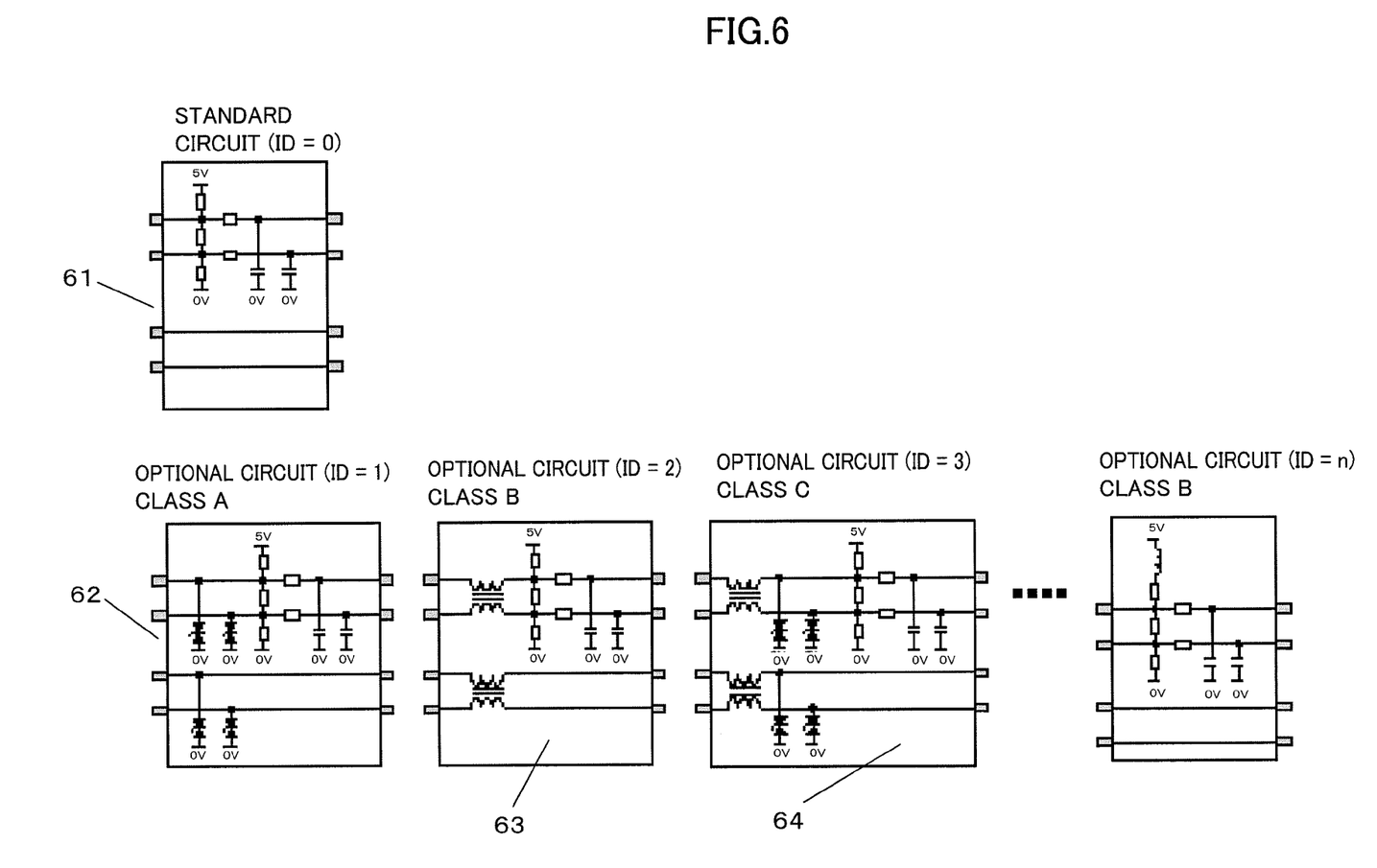
FIG. 6 is a diagram illustrating examples of a standard circuit and an optional circuit of a filter circuit used in the present invention and an example of the ID given to each filter circuit.

FIG. 6 is a diagram illustrating examples of a standard circuit and an optional circuit of the filter circuit 6, which are used when the need for replacement of a filter circuit 6 in the numerical controller 2 or the data communication apparatus 4 is determined, and an example of the ID given to each filter circuit 6.

The filter circuit 6 is divided roughly into a standard circuit and an optional circuit. The standard circuit is a circuit indicated by reference numeral 61 in FIG. 6. In addition, the optional circuit includes an optional circuit 62, an optional circuit 63, an optional circuit 64, and the like, as illustrated in FIG. 6. Each filter circuit has an ID by which the filter circuit can be identified. In addition, from the viewpoint of noise immunity, the optional circuit is divided into several classes, such as class A, class B, and class C. The noise immunity increases gradually in order of standard circuit, class A, class B, class C, . . . .

A known method can be used to detect the influence of noise on the communication cable 7 or the power cable 8.

In the detection of the influence of noise on the communication cable 7, for example, a cyclic redundancy check (CRC) signal is added to a data signal, signal transmission from the numerical controller 2 to each data communication apparatus 4 is performed and signal transmission from each data communication apparatus 4 to the numerical controller 2 is performed on the contrary, and the CRC of the signal received by the numerical controller 2 and each data communication apparatus 4 is checked to specify the communication cable 7 in which a data transfer error has occurred due to the influence of noise.

On the other hand, in the detection of the influence of noise of the power cable 8, it is detected that the operation of the data communication apparatus 4 becomes unstable due to the influence of noise. In the example illustrated in FIG. 5, when a signal is transmitted from the numerical controller 2 to each data communication apparatus 4, an error occurs when checking the CRC of the signal received by each of the second and subsequent data communication apparatuses 4. On the contrary, when a signal is transmitted from each data communication apparatus 4 to the numerical controller 2, an error occurs when checking the CRC of the signal received by each of the second data communication apparatus 4, the first data communication apparatus 4 (before the second data communication apparatus 4), and the numerical controller 2 (before the first data communication apparatus 4). Therefore, the influence of noise of the power cable 8 can be distinguished from the case of the transfer error of the communication cable 7.

A known method can also be used to detect the sign of the data transfer error in the communication cable 7 or the power cable 8.

As an example, when performing serial data communication, the phase of the rising or falling edge of the received signal is detected, an integrated value of the square value (or absolute value) of the phase difference between the phase of the received signal and the phase of the reference clock per fixed period is calculated, and it can be determined that there is a sign of the error when the calculated integrated value exceeds a threshold value set in advance. The sign of the error can be determined before the error actually occurs.

For detecting such a data transfer error or the sign thereof, the above-described known method can be used, but the data transfer error or the sign thereof can be a transient abnormality in some cases. For this reason, a replacement location or a filter circuit to be replaced may be specified according to the frequency of occurrence of retry when a transfer error occurs, instead of specifying the replacement location on the basis of only one occurrence of transfer error.

Figure 7:
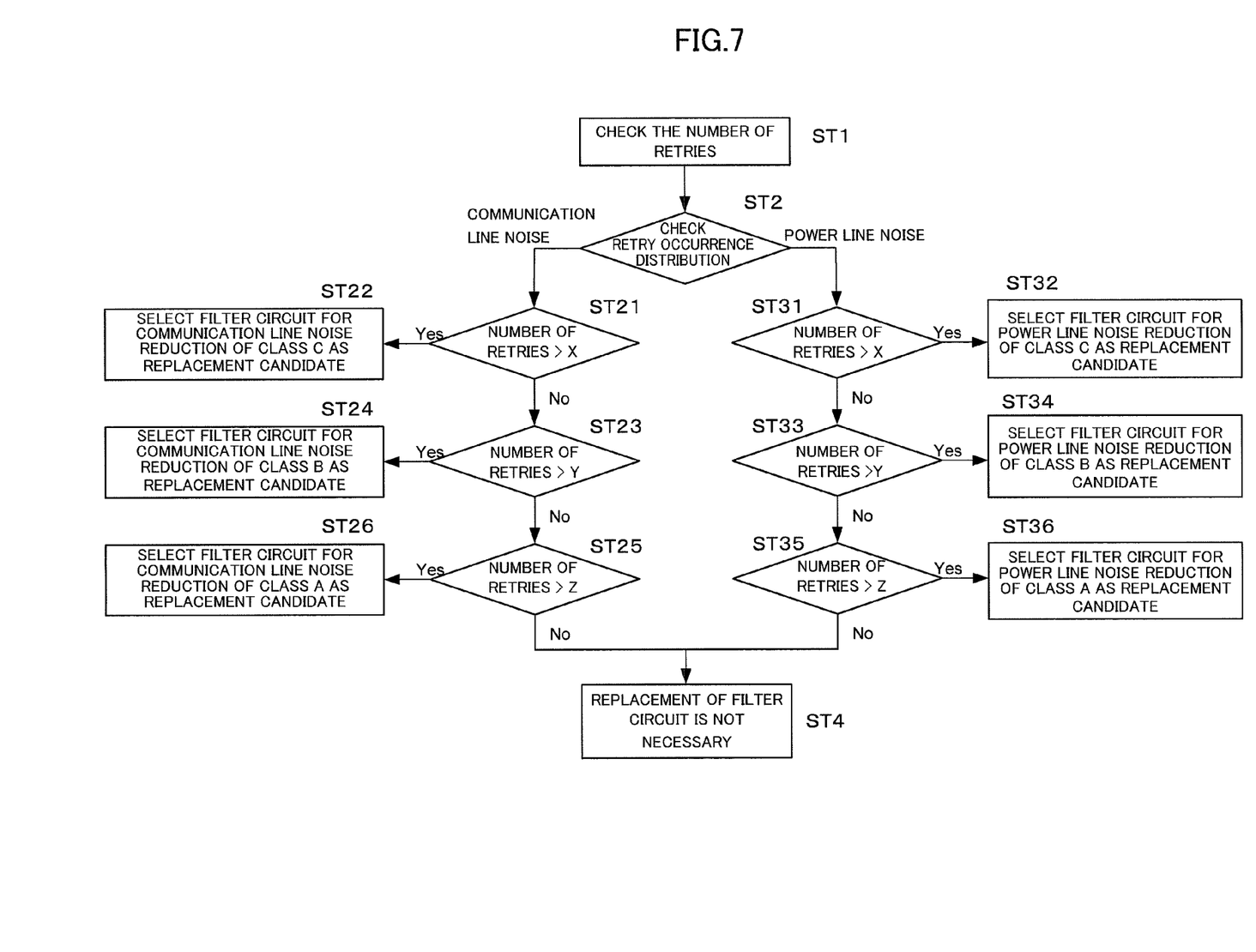
FIG. 7 is a flowchart for determining a noise immunity filter circuit to be replaced according to the number of retries for data transfer errors in the numerical control system of the present invention.

FIG. 7 is a flowchart of a processing for determining a noise immunity filter circuit to be replaced according to the number of retries for data transfer errors, by the filter circuit replacement determination unit 31 of the numerical control system 1 of the present invention.

In data communication between a numerical controller and a communication apparatus, when an error of data transfer occurs due to the influence of noise, retry processing is performed. In this case, if retry processing is performed and the retry processing is successfully completed, the system continues data communication, assuming that the error of data communication that has occurred is just a transient abnormality, as a result, there is no problem; if retry processing is performed and an error of data transfer occurs continuously multiple times (if the error is not recovered even after retry processing), on the other hands, the system determines that a permanent abnormality has occurred so that it is difficult to continue data communication any more and then stops data communication between the numerical controller 2 and a data communication apparatus 4 and notifies a user of an abnormality of data communication (alarm processing is performed).

In addition, when the error of data communication occurs, the communication content (including the error content) at that time is stored as communication history, for example, in a memory provided in a data communication control unit 22 in the numerical controller 2 that is a master apparatus.

The retry processing is used for the selection of the filter circuit 6. It is possible to select a class as a candidate for a filter circuit considered to be optimal by setting several threshold values (for example, X, Y, and Z, where there is a relationship of X>Y>Z) in advance for the number of retries, counting the number of retries that have occurred within a certain period of time or until alarm processing is performed due to continuous occurrence of the error, and comparing the counted value with the threshold value of the number of retries set in advance.

A specific method of determining the noise immunity filter circuit 6 to be replaced will be described with reference to FIG. 7.

In step ST1, the number of retries is checked. Then, in step ST2, it is determined whether the candidate location of the occurrence of the data transfer error is the communication cable 7 or the power cable 8 by checking the retry occurrence distribution. Then, when it is determined that the data transfer error has occurred in the communication cable 7 (generation of communication line noise) in step ST2, the process proceeds to step ST21.

Several threshold values are set as the threshold values of the number of retries. Here, as described above, X, Y, and Z (X>Y>Z) are set as the threshold values. In step ST21, it is determined whether or not the number of retries exceeds X. When the number of retries exceeds X (Yes), the process proceeds to step ST22. In step ST22, a filter circuit of class C with the highest noise immunity is selected as a replacement candidate for the filter circuit 6.

On the other hand, when the number of retries does not exceed X (No), the process proceeds to step ST23. In step ST23, it is determined whether or not the number of retries exceeds Y. When the number of retries exceeds Y (Yes), the process proceeds to step ST24. In step ST24, a filter circuit of class B with the highest noise immunity next to class C is selected as a replacement candidate for the filter circuit 6.

On the other hand, when the number of retries does not exceed Y (No), the process proceeds to step ST25. In step ST25, it is determined whether or not the number of retries exceeds Z. When the number of retries exceeds Z (Yes), the process proceeds to step ST26. In step ST26, a filter circuit of class A with the highest noise immunity next to class B is selected as a replacement candidate for the filter circuit 6.

On the other hand, when the number of retries does not exceed Z and a communication error has been resolved, the process proceeds to step ST4. In step ST4, it is determined that there is no problem since the error of data communication is a transient abnormality and accordingly it is determined that replacement of the filter circuit 6 is unnecessary.

When it is determined that the data transfer error has occurred in the power cable 8 (generation of power noise) in step ST2, the process proceeds to step ST31. Subsequent determination is the same as when the data transfer error has occurred in the communication cable 7. That is, when the number of retries exceeds X (step ST31), a filter circuit of class C is selected as a replacement candidate (step ST32). When the number of retries does not exceed X but exceeds Y (step ST33), a filter circuit of class B is selected as a replacement candidate (step ST34). When the number of retries does not exceed Y but exceeds Z (step ST35), a filter circuit of class A is selected as a replacement candidate (step ST36). When the number of retries does not exceed Z, it is determined that replacement of the filter circuit 6 is unnecessary (step ST4).

In the present embodiment, in consideration of the characteristics of the communication cable 7 and the power cable 8, as the filter circuit 6 being a candidate to be replaced, either a filter circuit for communication line noise reduction or a filter circuit for power line noise reduction is selectively set according to whether the occurrence location of the data transfer error is the communication cable 7 or the power cable 8 even if the class of noise immunity is the same. However, as the filter circuit 6 being a candidate to be replaced, a filter circuit may also be used in common for communication line noise reduction and power line noise reduction.

Figure 8:
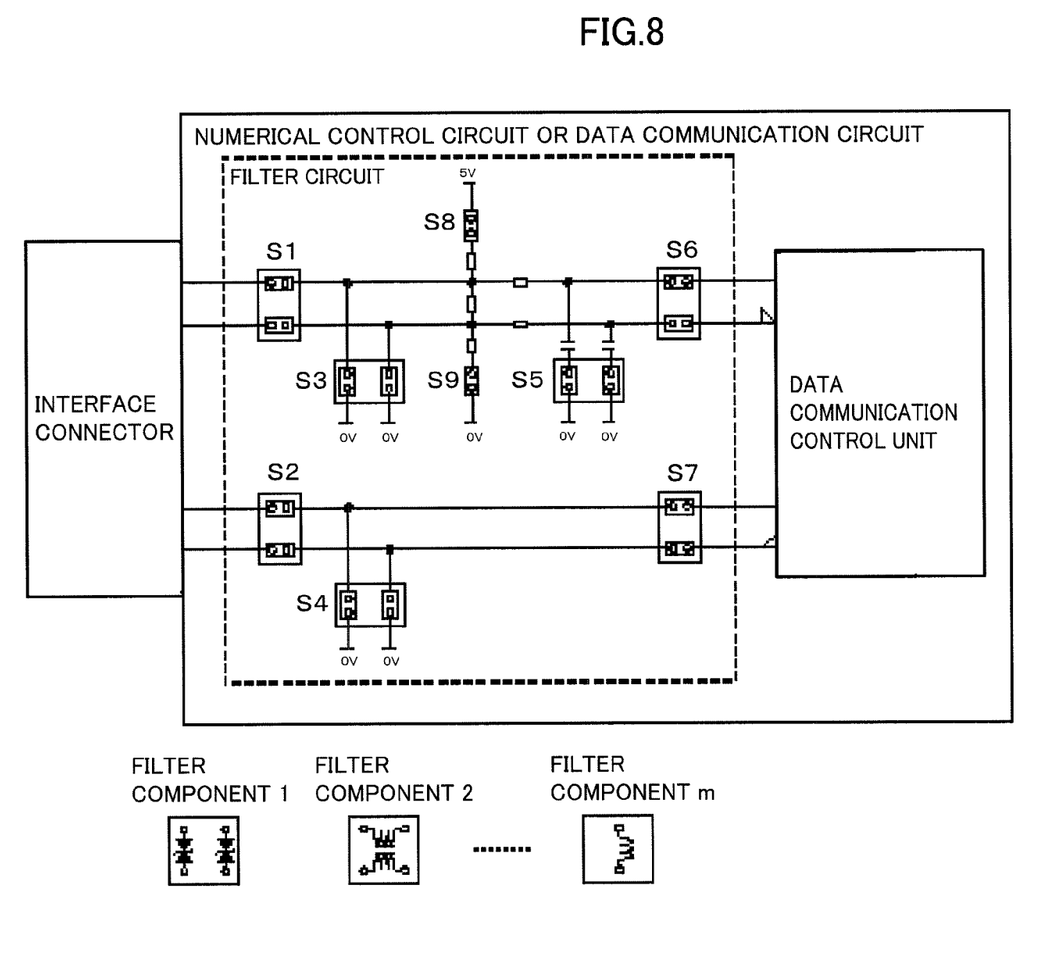
FIG. 8 is a diagram illustrating an example of a numerical controller or a data communication apparatus, in which only some filter circuits are removably provided, in the numerical control system of the present invention.

FIG. 8 is a diagram illustrating an example of a numerical controller or a data communication apparatus, in which only some filter circuits are made removable, in the numerical control system of the present invention. An optional circuit of the filter circuit 6 is formed by adding a filter component to a standard circuit. Accordingly, the standard circuit may be directly mounted and fixed onto the numerical controller and the data communication apparatuses so as not to be removable, and only a filter circuit in which a filter component for realizing an optional circuit is mounted may be made removable.

For example, a circuit is made to function as a standard circuit by allowing the circuit to be short-circuited or open-circuited by attaching or not attaching a short-circuit plug to a connector pin. When the short-circuit plug is attached, the short-circuit plug is removed and only a filter circuit in which a filter component for realizing an optional circuit is mounted is attached to the connector pin, thereby forming an option circuit.

Thus, since the standard circuit is directly mounted on the numerical controller and the data communication apparatuses and only a filter circuit in which a filter component for realizing the optional circuit is mounted is configured so that it may be attached and detached, the configuration of the standard circuit can be realized at low cost, compared with a configuration in which whole of a filter circuit is attached and detached.

For example, in FIG. 8, a standard circuit is formed by attaching a short-circuit plug in S1, S2, and S5 to S9 and not attaching a short-circuit plug in S3 and S4. The above optional circuit 62 of ID=1 can be realized by attaching a filter component 1 in S3 and S4 in the configuration of the standard circuit. In addition, the above optional circuit 63 of ID=2 can be realized by removing the short-circuit plugs of S1 and S2 and attaching filter components 2 in S1 and S2, in the configuration of the standard circuit.

In the present embodiment, a unique ID of the filter circuit 6 is stored in the ID storage unit 45, which is provided in each of the numerical controller 2 and the data communication apparatuses 4, at the time of supply of electric power to the numerical control system 1, and the ID of the filter circuit stored in the ID storage unit 45 is stored in the error information storage unit 29 of the numerical controller 2 together with error information when the error information is detected. However, a unique ID of the filter circuit 6 provided in each data communication apparatus 4 may also be stored in the connection information storage unit 28, which is provided in the numerical controller 2 and stores the connection information of the data communication apparatus 4, at the time of initialization processing when electric power is supplied to the numerical controller 2.

According to such a configuration, the unique ID of the filter circuit 6 provided in each data communication apparatus 4 is stored in advance in the connection information storage unit 28 of the numerical controller at the time of initialization processing when electric power is supplied. Therefore, as data transmitted from the data communication apparatus 4 to the numerical controller 2 at the time of error information detection, the error information and the ID of a filter circuit do not need to be transmitted together so as to match each other, and only the error information may be transmitted. As a result, it is possible to reduce the amount of data transmitted from the data communication apparatus 4 to the numerical controller 2 at the time of error information detection.

In the present embodiment, the ID storage unit 25, the filter information storage unit 27, the connection information storage unit 28, and the like are provided separately from the data communication control unit 22 in the numerical controller 2. However, the ID storage unit 25, the filter information storage unit 27, the connection information storage unit 28, and the like do not necessarily need to be provided separately from the data communication control unit 22. For example, the data communication control unit 22 may be made to have functions of the ID storage unit 25 and the filter information storage unit 27, so that the ID or the like of the filter circuit 6 can be stored in the data communication control unit 22.

In addition, although the example of the so-called daisy-chain numerical control system 1 in which a plurality of data communication apparatuses 4 are connected in series to the numerical controller 2 has been described in the present embodiment, the present invention is not limited to the daisy-chain mode. The present invention can also be applied to the case of a connection mode in which each data communication apparatus 4 is directly connected to the numerical controller 2 disposed at the center, as long as the occurrence location of a data transfer error or the sign thereof can be specified.

The invention claimed is:

1. A numerical control system, comprising:
a plurality of data communication apparatuses; and
a numerical controller that transmits and receives data to and from the data communication apparatuses,
wherein each of the data communication apparatuses includes:
a filter circuit removably attached to a connection unit for connection with the numerical controller or another data communication apparatus that is connected before the data communication apparatus, and/or a connection unit for connection with another data communication apparatus that is connected after the data communication apparatus;
a data transfer error detection unit that detects a data transfer error or a sign of the data transfer error as error information; and
a data transmission unit that transmits the error information detected by the data transfer error detection unit to the numerical controller, and
the numerical controller includes:
a filter circuit removably attached to the connection unit for connection with the data communication apparatus;
a data transfer error detection unit that detects a data transfer error or a sign of the data transfer error as error information;
an error information storage unit that stores the error information detected by the data transfer error detection unit of the numerical controller and the error information received from the data communication apparatus, in association with the numerical controller or the data communication apparatus in which the error information has occurred;
a filter circuit replacement determination unit that specifies a filter circuit, which needs to be replaced, of the filter circuits provided in the numerical controller and the data communication apparatus from the error information stored in the error information storage unit;
an output unit that outputs information prompting replacement of a filter circuit specified on the basis of a determination result of the filter circuit replacement determination unit; and
a filter information storage unit that stores noise immunity levels of a plurality of filter circuits,
wherein the filter circuit replacement determination unit specifies the noise immunity level of a filter circuit, which is to be replaced, from the error information and the noise immunity levels, and when the output unit outputs the information prompting the replacement of the filter circuit, information of a filter circuit having noise immunity specified on a basis of a determination result of the filter circuit replacement determination unit is output.

2. The numerical control system according to claim 1, wherein the plurality of data communication apparatuses is connected in series to each other.

3. The numerical control system according to claim 1, wherein the filter circuit is configured to include a first filter circuit removably attached to the data communication apparatus or the numerical controller and a second filter circuit fixed to the data communication apparatus or the numerical controller.

4. The numerical control system according to claim 1, wherein each filter circuit has a unique ID by which the filter circuit is identifiable,
each of the numerical controller and the data communication apparatuses has an ID storage unit,
when electric power is supplied to the numerical control system, the unique ID is stored in the ID storage unit of the numerical controller or the data communication apparatus in which the filter circuit is provided, and
when error information is detected in the numerical controller or the data communication apparatus, the error information and the unique ID of the filter circuit, which is stored in the ID storage unit of the numerical controller or the data communication apparatus in which the error information has been detected, are stored in the error information storage unit of the numerical controller.

5. The numerical control system according to claim 1, wherein the numerical controller further includes a connection information storage unit that stores connection information regarding a connection with a data communication apparatus connected to the numerical controller,
the filter circuit has a unique ID by which the filter circuit is identifiable, and
the ID of the filter circuit is stored in the connection information storage unit at the time of initialization processing when electric power is supplied to the numerical control system.

6. The numerical control system according to claim 2, wherein each filter circuit has a unique ID by which the filter circuit is identifiable,
each of the numerical controller and the data communication apparatuses has an ID storage unit,
when electric power is supplied to the numerical control system, the unique ID is stored in the ID storage unit of the numerical controller or the data communication apparatus in which the filter circuit is provided, and
when error information is detected in the numerical controller or the data communication apparatus, the error information and the unique ID of the filter circuit, which is stored in the ID storage unit of the numerical controller or the data communication apparatus in which the error information has been detected, are stored in the error information storage unit of the numerical controller.

7. The numerical control system according to claim 3, wherein each filter circuit has a unique ID by which the filter circuit is identifiable,
each of the numerical controller and the data communication apparatuses has an ID storage unit,
when electric power is supplied to the numerical control system, the unique ID is stored in the ID storage unit of the numerical controller or the data communication apparatus in which the filter circuit is provided, and
when error information is detected in the numerical controller or the data communication apparatus, the error information and the unique ID of the filter circuit, which is stored in the ID storage unit of the numerical controller or the data communication apparatus in which the error information has been detected, are stored in the error information storage unit of the numerical controller.

8. The numerical control system according to claim 2, wherein the numerical controller further includes a connection information storage unit that stores connection information regarding a connection with a data communication apparatus connected to the numerical controller,
the filter circuit has a unique ID by which the filter circuit is identifiable, and
the ID of the filter circuit is stored in the connection information storage unit at the time of initialization processing when electric power is supplied to the numerical control system.

9. The numerical control system according to claim 3, wherein the numerical controller further includes a connection information storage unit that stores connection information regarding a connection with a data communication apparatus connected to the numerical controller,
the filter circuit has a unique ID by which the filter circuit is identifiable, and
the ID of the filter circuit is stored in the connection information storage unit at the time of initialization processing when electric power is supplied to the numerical control system.

* * * * *